(12) United States Patent
Aoyagi et al.

(10) Patent No.: US 10,901,078 B2
(45) Date of Patent: Jan. 26, 2021

(54) MONITORING DEVICE AND MONITORING METHOD

(71) Applicants: FURUKAWA ELECTRIC CO., LTD., Tokyo (JP); FURUKAWA AUTOMOTIVE SYSTEMS INC., Shiga (JP)

(72) Inventors: Yasushi Aoyagi, Shiga (JP); Nobuyuki Shimizu, Shiga (JP)

(73) Assignees: FURUKAWA ELECTRIC CO., LTD., Tokyo (JP); FURUKAWA AUTOMOTIVE SYSTEMS INC., Shiga (JP)

( * ) Notice: Subject to any disclaimer, the term of this patent is extended or adjusted under 35 U.S.C. 154(b) by 301 days.

(21) Appl. No.: 15/974,935

(22) Filed: May 9, 2018

(65) Prior Publication Data

US 2018/0259636 A1 Sep. 13, 2018

Related U.S. Application Data

(60) Provisional application No. PCT/JP2016/083440, filed on Nov. 10, 2016.

(30) Foreign Application Priority Data

Nov. 10, 2015 (JP) ................................. 2015-220801

(51) Int. Cl.
*B60R 21/34* (2011.01)
*G01S 13/56* (2006.01)
(Continued)

(52) U.S. Cl.
CPC .............. *G01S 13/56* (2013.01); *B60R 21/00* (2013.01); *B60R 21/34* (2013.01); *G01S 13/04* (2013.01);
(Continued)

(58) Field of Classification Search
CPC ......... B60R 21/00; B60R 21/34; G01S 13/04; G01S 13/56; G01S 13/931; G01S 2013/9315; G08B 21/00; G08G 1/16
See application file for complete search history.

(56) References Cited

U.S. PATENT DOCUMENTS

2005/0073433 A1\* 4/2005 Gunderson ............ B60Q 9/006
340/903
2006/0077052 A1 4/2006 Matsuoka
(Continued)

FOREIGN PATENT DOCUMENTS

CN 103718214 A 4/2014
CN 103999138 A 8/2014
(Continued)

OTHER PUBLICATIONS

European Search Report dated Dec. 11, 2018 in a counterpart European patent application No. 16864331.0.
(Continued)

*Primary Examiner* — Timothy A Brainard
(74) *Attorney, Agent, or Firm* — Chen Yoshimura LLP

(57) ABSTRACT

A monitoring device to monitor traffic behind and on both sides of a vehicle includes a radar detecting a traveling object in a pair of first detection areas that are defined behind and on left and right sides, respectively, of the vehicle and in a pair of second detection areas that are defined behind and on the left and right sides, respectively, of the vehicle, the second detection area having a width in a vehicle width direction narrower than a width of the first detection area; a detector detecting a moving direction in which the vehicle is moving and other moving indicators to find a moving status of the vehicle; and a processor causing the radar to switch to the second detection areas when the detected moving status indicates that the moving direction of the vehicle is straight
(Continued)

ahead and at least one other moving indicator satisfies a prescribed condition.

9 Claims, 6 Drawing Sheets

(51) Int. Cl.
  *G08G 1/16* (2006.01)
  *G08B 21/00* (2006.01)
  *B60R 21/00* (2006.01)
  *G01S 13/04* (2006.01)
  *G01S 13/931* (2020.01)
(52) U.S. Cl.
  CPC ............ *G01S 13/931* (2013.01); *G08B 21/00* (2013.01); *G08G 1/16* (2013.01); *G01S 2013/9315* (2020.01)

(56) References Cited

U.S. PATENT DOCUMENTS

| | | | |
|---|---|---|---|
| 2008/0164985 A1* | 7/2008 | Iketani | G01S 17/89 340/435 |
| 2014/0015693 A1 | 1/2014 | Komoguchi et al. | |
| 2014/0039786 A1* | 2/2014 | Schleicher | B60W 30/09 701/301 |
| 2014/0146176 A1 | 5/2014 | Hayakawa et al. | |
| 2015/0192666 A1 | 7/2015 | Watanabe et al. | |

FOREIGN PATENT DOCUMENTS

| | | |
|---|---|---|
| CN | 104765030 A | 7/2015 |
| JP | 10-166975 A | 6/1998 |
| JP | 10-166976 A | 6/1998 |
| JP | H10-166974 A | 6/1998 |
| JP | 2006-88896 A | 4/2006 |
| JP | 2007-62641 A | 3/2007 |
| JP | 2008-114627 A | 5/2008 |
| JP | 2011-141746 A | 7/2011 |
| JP | 2011141746 A * | 7/2011 |
| JP | 2014-85869 A | 5/2014 |
| WO | 2015/152793 A1 | 10/2015 |

OTHER PUBLICATIONS

English translation of Written Opinion (PCT/ISA/237) issued in PCT/JP2016/083440 dated Feb. 2017.
International Search Report (ISR) issued in PCT/JP2016/083440 dated Feb. 2017.
Written Opinion (PCT/ISA/237) issued in PCT/JP2016/083440 dated Feb. 2017.
Chinese Office Action dated Jun. 11, 2020 in a counterpart Chinese patent application No. 201680065386.1. (A machine translation (not reviewed for accuracy) attached.).
Chinese Office Action dated Nov. 10, 2020 in a counterpart Chinese patent application No. 201680065386.1. A machine translation (not reviewed for accuracy) attached.).

* cited by examiner

MONITORING DEVICE AND MONITORING METHOD

BACKGROUND OF THE INVENTION

Technical Field

The present invention relates to a monitoring device and a monitoring method.

Background Art

Patent document 1 discloses a technology regarding a warning device for preventing a minor collision with a following vehicle when a host vehicle changes a lane. The technology is referred to as Blind Spot Detection (BSD) or the like. The technology is capable of detecting a blind spot of a driver.

Patent document 2 discloses a vehicle rear side warning device configured not to issue a warning against a roadside stationary object such as a guardrail and a wall and to issue a warning against a vehicle approaching from behind or a vehicle staying in a blind spot area of the host vehicle.

Patent document 3 discloses a technology to detect a host vehicle position with respect to a lane width, thus preventing deterioration in an accuracy of detecting another vehicle due to a shift of a rear side warning area resulting from a displacement of the host vehicle in a lateral direction.

RELATED ART DOCUMENTS

Patent Documents

Patent Document 1: JP H10-166974 A
Patent Document 2: JP 2006-88896 A
Patent Document 3: JP 2011-141746 A

SUMMARY OF INVENTION

In technologies described in Patent Documents 1 to 3, a warning may continue to be issued in a case of low-speed driving due to a traffic jam or the like because more vehicles than usual are approaching the host vehicle from rearward side. Thus, measures have been taken such that a warning is not issued under such conditions.

However, turning off a warning device during the low-speed driving may cause following problems. When the host vehicle changes a lane during a traffic jam, the warning cannot be issued even in a case that an object such as a two-wheel vehicle passing through either side of the host vehicle is present, or when the driver of the host vehicle attempts to park the host vehicle at a shoulder of a road, a warning cannot be issued even in a case that an object such as a two-wheel vehicle passing between the shoulder of the road and the host vehicle is present.

An object of the present invention is to provide a monitoring device and a monitoring method capable of reliably detecting an object entering an area on either side of a host vehicle during low-speed driving or the like.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a monitoring device configured to be installed in a vehicle to monitor traffic behind and on both sides of the vehicle, the monitoring device including: a radar configured to detect a traveling object in a pair of first detection areas that are defined behind and on left and right sides, respectively, of the vehicle and in a pair of second detection areas that are defined behind and on the left and right sides, respectively, of the vehicle, the second detection area having a width in a vehicle width direction narrower than a width of the first detection area; a detector configured to detect a moving status of the vehicle, the detector detecting a moving direction in which the vehicle is moving and other moving indicators to find the moving status; and a processor that controls the radar, the processor causing the radar to switch between the pair of first detection areas and the pair of second detection areas when the detected moving status indicates that the moving direction of the vehicle is straight ahead and at least one of the other moving indicators satisfies a prescribed condition.

This configuration enables the monitoring device to reliably detect an object entering an area on either side of the host vehicle.

In an aspect of the present invention, the monitoring device may further include an alarm configured to issue a warning when the radar is caused to select the pair of second detection areas, and the radar detects an object present in at least one of the second detection areas.

This configuration enables the monitoring device to attract attention of a driver in a case that an object entering an area on either side of the host vehicle is detected.

In an aspect of the present invention, the processor may cause the radar to select the pair of second detection areas when the detector detects that the vehicle is traveling forward at a speed that is less than or equal to a prescribed speed.

This configuration enables the monitoring device to reliably detect an object entering an area on either side of the host vehicle with a simple configuration.

In an aspect of the present invention, the monitoring device may further include an alarm configured to issue a warning when the radar is caused to select the pair of second detection areas, the radar detects an object present in at least one of the second detection areas, and the processor determines that the detected object will intersect a collision determination line set in the at least one of the second detection areas.

This configuration enables the monitoring device to reliably detect whether an object entering an area on either side of the host vehicle collides with the host vehicle.

In an aspect of the present invention, the monitoring device may further include an alarm configured to issue a warning when the radar is caused to select the pair of second detection areas, the radar detects an object present in at least one of the second detection areas, and the processor determines that an operation for changing the moving direction of the vehicle is performed.

In such a configuration, a side collision between an object entering an area on either side of the host vehicle and the host vehicle changing direction can reliably be prevented.

In an aspect of the present invention, the monitoring device may further include an alarm configured to issue a warning when the radar is caused to select the pair of second detection areas, the radar detects an object present in at least one of the second detection areas, and the processor determines that an operation for opening a window or a door of the vehicle is performed.

In such a configuration, a minor collision between an object entering an area on either side of the host vehicle and a part of a passenger body or a door can be prevented.

In an aspect of the present invention, when the processor causes the radar to switch between the pair of first detection areas and the pair of second detection areas, the processor causes the radar to set the pair of first detection areas and the pair of second detection areas both active for a prescribed period of time.

In such a configuration, the possibility that an object cannot be detected in a case that the detection areas are switched can be eliminated.

In an aspect of the present invention, the processor causes the radar to select the pair of first detection areas when the moving direction of the vehicle detected as part of the moving status is not straight ahead.

This configuration allows a broad area to be set as a detection area, avoiding not only a side collision between an object and the host vehicle changing direction but also a collision between the object and the host vehicle.

In an aspect of the present invention, on each side of the vehicle, a side end of the second detection area closer to the vehicle may be set to a position nearer to the vehicle than a position of a side end of the first detection area closer to the vehicle.

This configuration enables the monitoring device to reliably detect the object approaching the host vehicle and entering an area on either side of the host vehicle.

In another aspect, the present disclosure provides a method for monitoring traffic behind and on a side of a vehicle, the method including: detecting a moving status of the vehicle by a detector, the detector detecting a moving direction in which the vehicle is moving and other moving indicators to find the moving status; controlling, by a processor, a radar that detects a traveling object in a pair of first detection areas that are defined behind and on left and right sides, respectively, of the vehicle and in a pair of second detection areas that are defined behind and on the left and right sides, respectively, of the vehicle, the second detection area having a width in a vehicle width direction narrower than a width of the first detection area; wherein the control of the radar by the processor includes switching between the pair of first detection areas and the pair of second detection areas when the detected moving status indicates that the moving direction of the vehicle is straight ahead and at least one of the other moving indicators satisfies a prescribed condition.

This method allows the object entering an area on either side of the host vehicle to be reliably detected.

According to aspects of the present invention, a monitoring device and a monitoring method can be provided that enable reliable detection of an object entering an area on either side of a host vehicle during low-speed driving or the like.

It is to be understood that both the foregoing general description and the following detailed description are exemplary and explanatory, and are intended to provide further explanation of the invention as claimed.

DESCRIPTION OF EMBODIMENTS

Embodiments of the present invention are described below.

(A) Description of Configuration of the Embodiment

Figure 1:
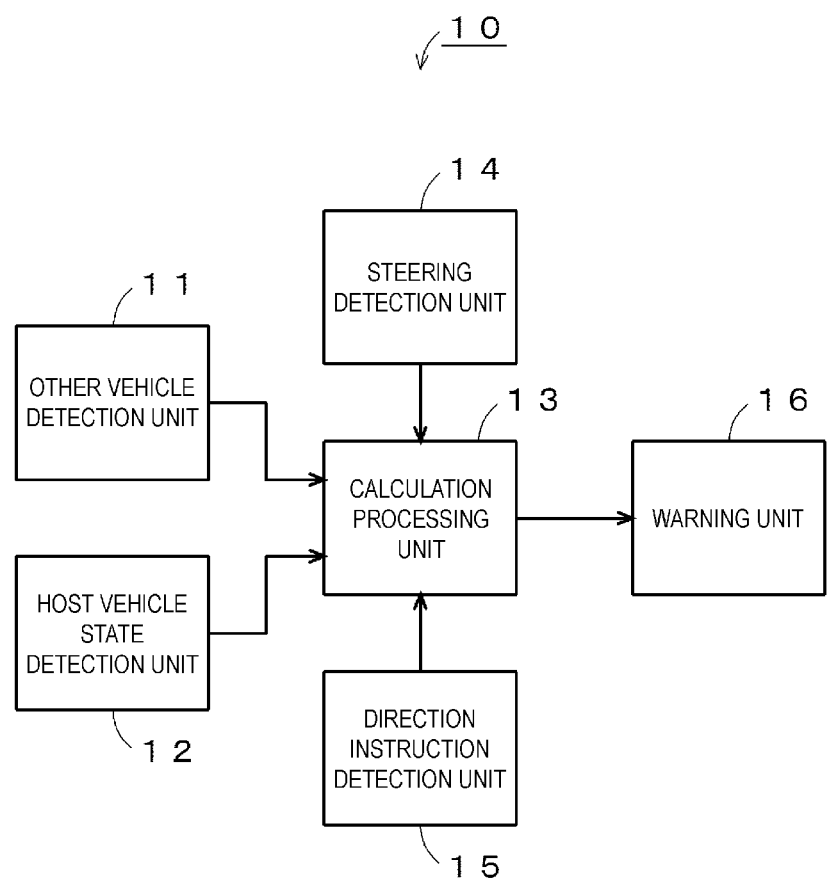
FIG. 1 is a diagram illustrating an example of a configuration of a monitoring device according to an embodiment of the present invention.

FIG. 1 is a diagram illustrating an example of a configuration of a monitoring device according to an embodiment of the present invention. As illustrated in FIG. 1, a monitoring device 10 includes the following primary components: an other vehicle detection unit 11, a host vehicle state detection unit 12, a calculation processing unit 13, a steering detection unit 14, a direction instruction detection unit 15, and a warning unit 16.

The other vehicle detection unit 11 includes a radar device, for example. The radar device is configured to repeatedly emit pulse-like electric waves and detect a position, velocity, and the like of the other vehicle using a reflected wave thereof. Note that the other vehicle detection unit 11 is also configured to detect not only a two-wheel vehicle such as a motorcycle and a bicycle, but also a four-wheel vehicle (including a three-wheel vehicle and a vehicle including five wheels or greater), a pedestrian, and the like, as a target.

The host vehicle state detection unit 12 includes a vehicle speed sensor, a yaw axis sensor, a sensor configured to detect a state of a transmission, and a sensor configured to detect an open-close state of a door or a window, for example. The host vehicle state detection unit 12 is configured to detect a traveling state of the host vehicle and notify the calculation processing unit 13 of the detected state.

The calculation processing unit 13 includes a Central Processing Unit (CPU), a Digital Signal Processor (DSP), and a Field Programmable Gate Array (FPGA), for example. The calculation processing unit 13 is configured to detect a four-wheel vehicle or a two-wheel vehicle traveling behind the host vehicle in accordance with information supplied from the other vehicle detection unit 11, the host vehicle state detection unit 12, the steering detection unit 14, and the direction instruction detection unit 15, and determine whether the two-wheel vehicle or the four-wheel vehicle will possibly collide with the host vehicle. Thus, the calculation processing unit 13 causes the warning unit 16 to issue a warning in a case that the calculation processing unit 13 determines that the two-wheel vehicle or the four-wheel vehicle will possibly collide with the host vehicle. The calculation processing unit 13 is also configured to detect a two-wheel vehicle passing through either side of the host vehicle during a traffic jam or the like, and determine whether the two-wheel vehicle will possibly collide with the host vehicle. Thus, the calculation processing unit 13 causes the warning unit 16 to issue a warning in a case that the calculation processing unit 13 determines that the two-wheel vehicle will possibly collide with the host vehicle.

The warning unit 16 may include a speaker configured to sound a warning, a Light Emitting Diode (LED) configured to flash on and off, for example. In a case that the calculation processing unit 13 determines that there is a possibility of a collision or a minor collision, the warning unit 16 may sound a warning to attract an attention of a driver.

(B) Description of Operation of the Embodiment

Figure 2:
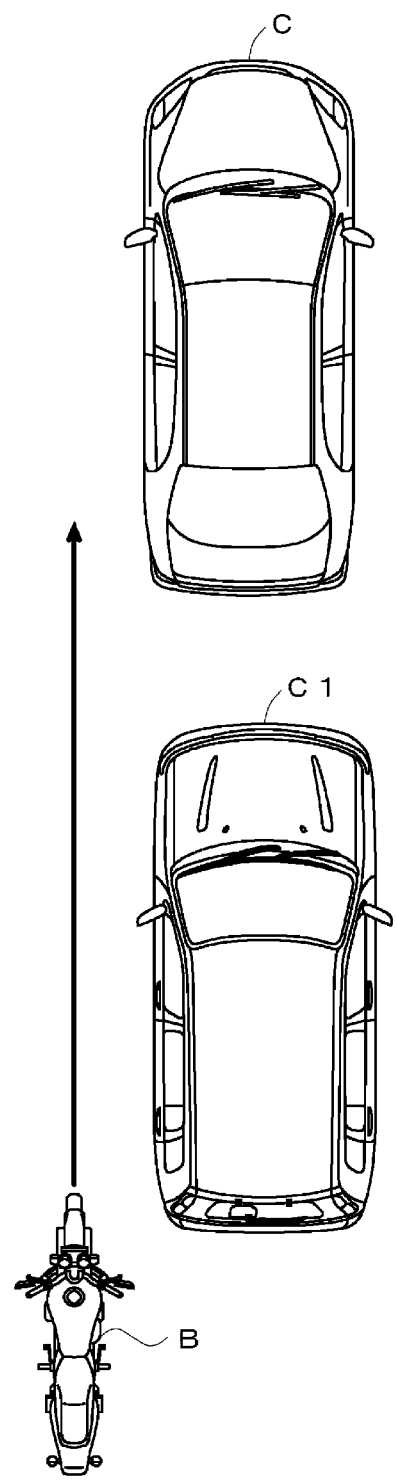
FIG. 2 is a diagram illustrating an operation of the embodiment illustrated in FIG. 1.

Next, the operation of the embodiment of the present invention will be described. As illustrated in FIG. 2, it is assumed that a two-wheel vehicle B such as a motorcycle or a bicycle passes through a left side of a host vehicle C and other vehicle C1 when the host vehicle C and the other vehicle C1 are traveling or at rest on a congested road.

In the present embodiment, the calculation processing unit 13 refers to information output from the host vehicle state detection unit 12 and switches from a normal operation mode to an operation mode for detecting a passing two-wheel vehicle in a case that a traveling speed of the host vehicle is less than or equal to a predetermined speed (i.e., 10 km/h), a gear selector of a transmission is at a position other than reverse, the host vehicle C travels straight forward, and the other vehicle detection unit 11 detects a target behind and on a side of the host vehicle C. Note that "the vehicle traveling straight forward" includes a vehicle traveling while meandering to some extent. The calculation processing unit 13 can determine that the vehicle travels straight forward, in a case that a yaw rate may be less than a predetermined threshold, for example.

Figure 3:
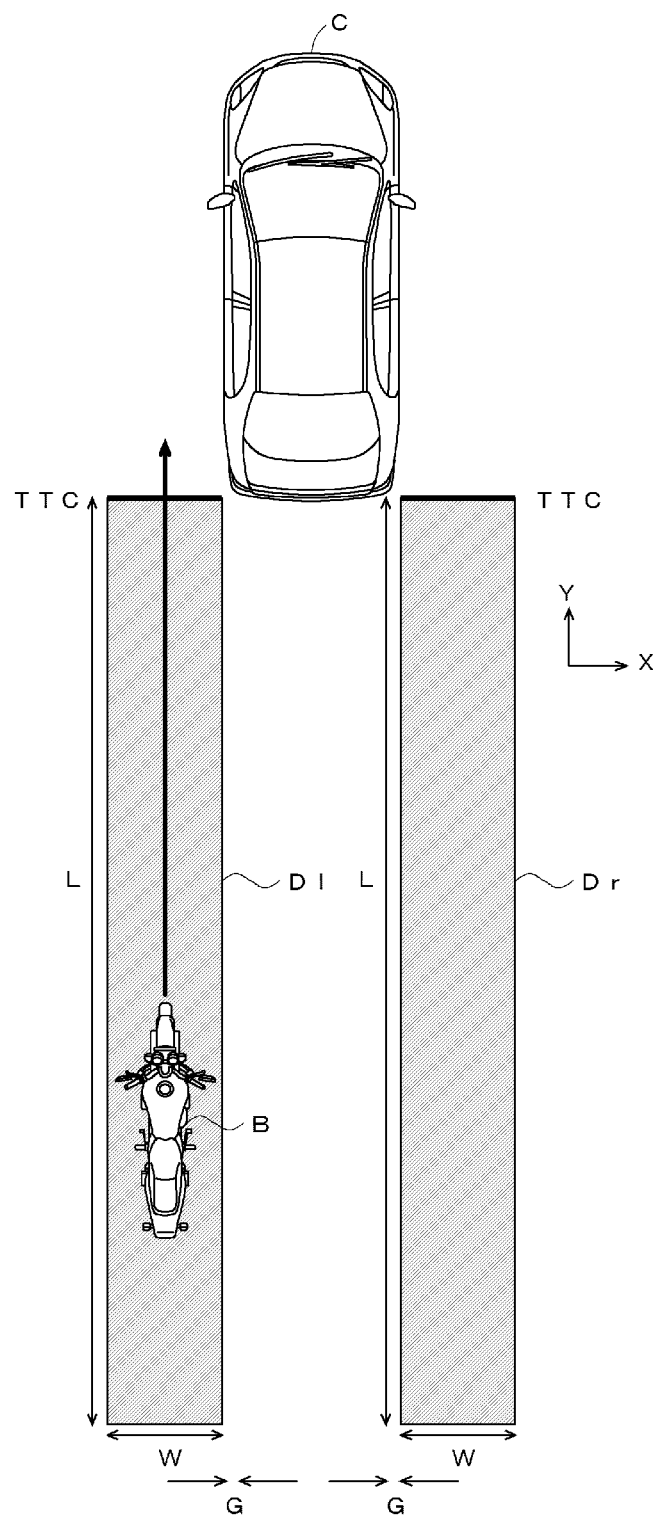
FIG. 3 is a diagram illustrating a detection area for detecting a two-wheel vehicle according to the embodiment illustrated in FIG. 1.

In an operation mode for detecting a two-wheel vehicle, as illustrated in FIG. 3, detection areas Dr, Dl are set to either side behind the host vehicle C. The detection areas Dr, Dl are set symmetrically left to right with respect to the host vehicle C, a length L of each of the areas in a traveling direction (moving direction) (Y direction) is approximately 10 m, for example, and a length of each of the areas in a direction (X direction) orthogonal to the traveling direction ranges from approximately 0.7 to approximately 1.5 m, for example. Furthermore, these detection areas Dr, Dl are set at positions separated from the side surfaces of the vehicle by G (approximately 0.09 m). Note that numerical values described above are examples, and other numerical values are possible.

Figure 4:
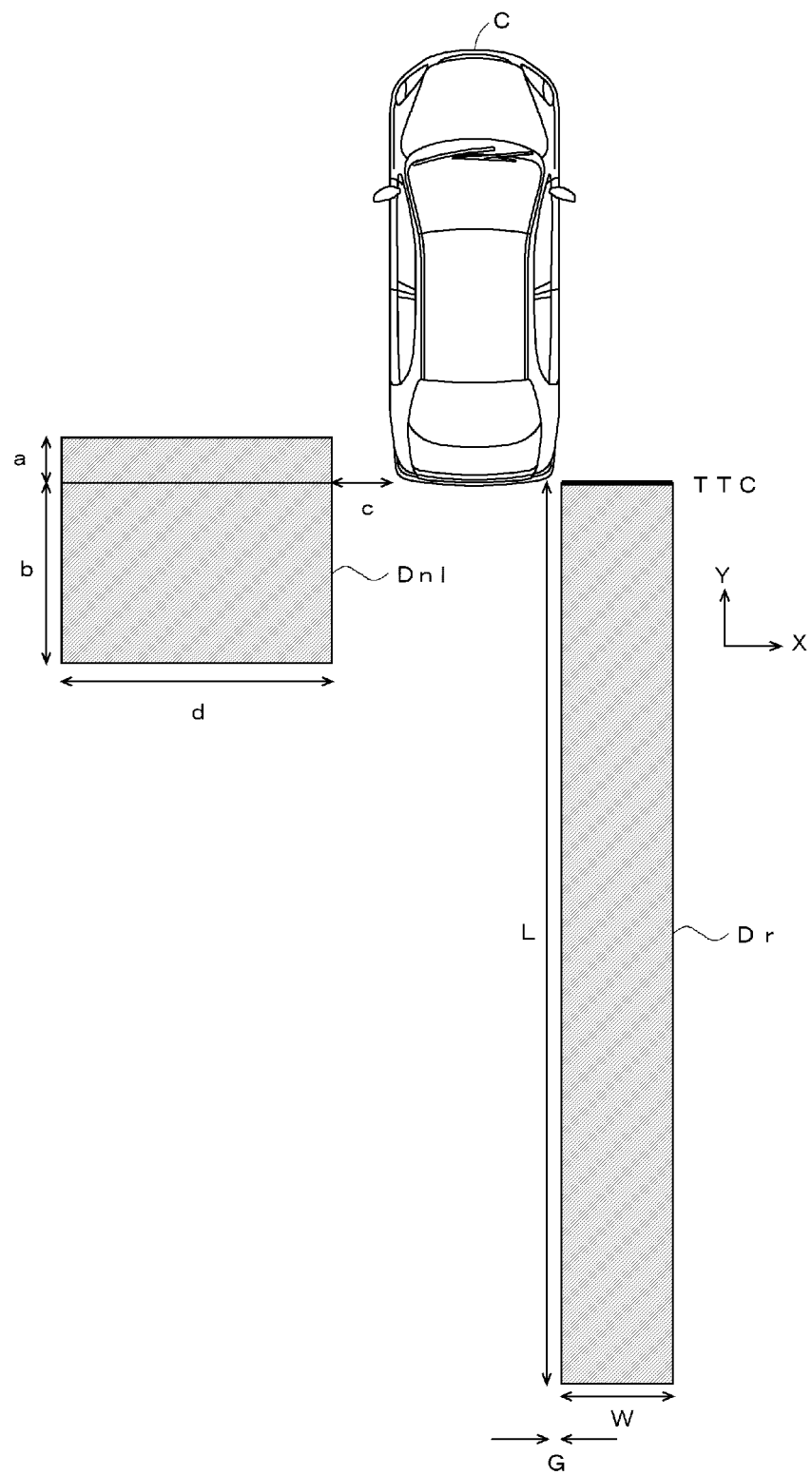
FIG. 4 is a diagram for comparing a detection area for detecting the two-wheel vehicle with a normal detection area according to the embodiment illustrated in FIG. 1.

FIG. 4 is a diagram for comparing a detection area in an operation mode for detecting a two-wheel vehicle with a detection area in a normal operation mode. The detection area in the normal operation mode is illustrated on a left side of FIG. 4, and the detection area in the operation mode for detecting a two-wheel vehicle is illustrated on a right side of FIG. 4. In the normal operation mode, the detection area Dnl is set not only behind the vehicle, but also to either side of the vehicle. a=0.5 m, b=2.0 m, c=0.5 m, and d=3.5 m can be given as examples of lengths of each part in the detection area. In this way, the detection area in the operation mode for detecting a two-wheel vehicle mainly differs from the detection area in the normal mode in that a width is narrow, the side detection area is not set, and an end of the detection area closer to the vehicle is disposed at a position near the vehicle (i.e., c>G). Note that the detection area for a four-wheel vehicle and a two-wheel vehicle illustrated in FIGS. 3 and 4 is given as one example, and the detection area having another shape is also possible.

Figure 5:
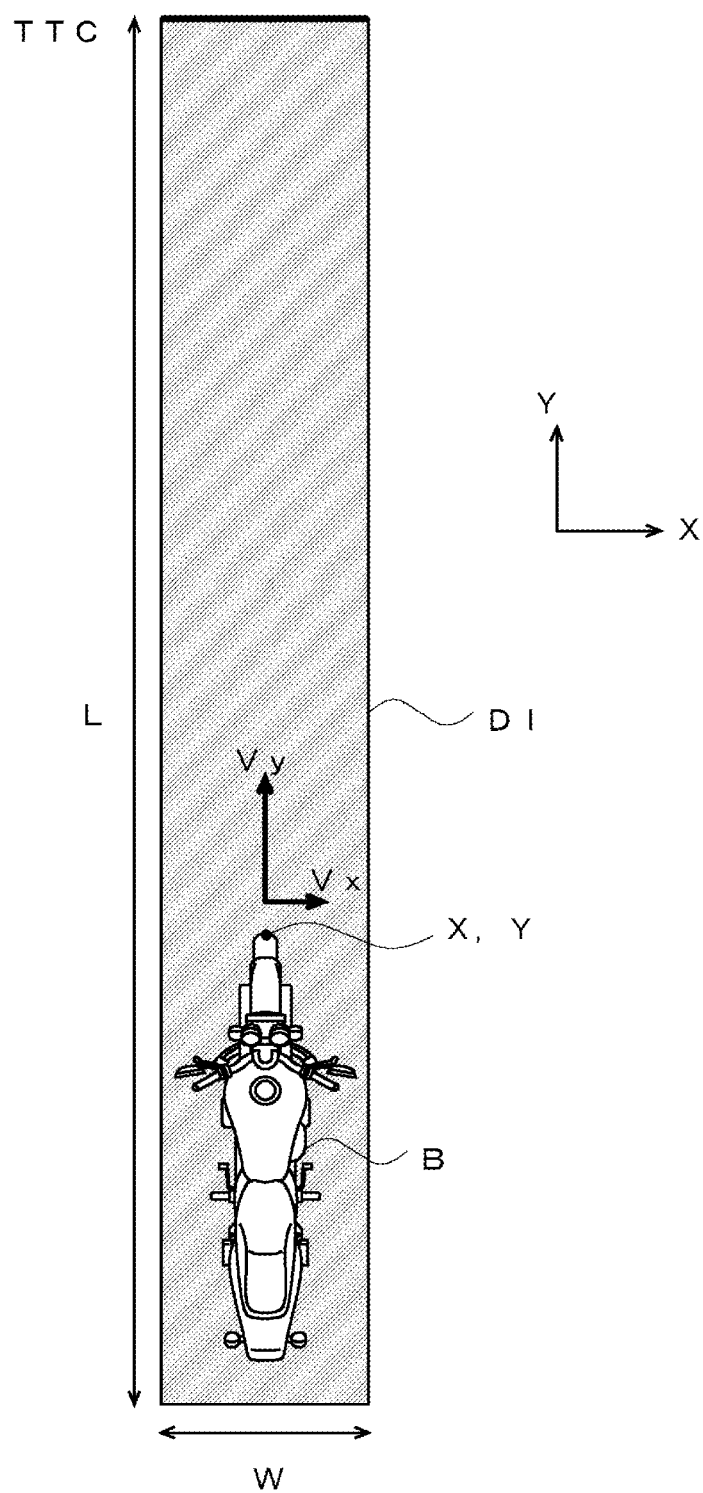
FIG. 5 is a diagram illustrating a detection area for detecting the two-wheel vehicle in detail according to the embodiment illustrated in FIG. 1.

After setting the detection areas Dl, Dr for detecting a two-wheel vehicle, the calculation processing unit 13 refers to information supplied from the other vehicle detection unit 11 and determines whether a two-wheel vehicle is present in the detection areas Dl, Dr. In a case that the calculation processing unit 13 determines that the two-wheel vehicle is present, the calculation processing unit 13 detects a position (X, Y) and a velocity (Vx, Vy) of the two-wheel vehicle B. Note that a position of the two-wheel vehicle B is indicated by a Cartesian coordinate system with a center of the host vehicle C as an origin. FIG. 5 is a diagram illustrating a relationship between the two-wheel vehicle B and the detection area Dl. In FIG. 5, the position (X, Y) of the two-wheel vehicle B is represented as a coordinate at a leading end of the two-wheel vehicle B. The velocity (Vx, Vy) of the two-wheel vehicle B is represented by a velocity in a X direction and a velocity in a Y direction of the two-wheel vehicle B. Note that the example illustrated in FIG. 5 is one example, and another method may be employed to represent the position and velocity. For example, the position (X, Y) of the two-wheel vehicle B may not be set at the leading end of the two-wheel vehicle B, and set at a center of the two-wheel vehicle B.

Next, the calculation processing unit 13 executes Time to Collision (TTC) line intersection determination using X, Y, Vx, and Vy found as described above. In a case that there is a possibility of intersection, the calculation processing unit 13 causes the warning unit 16 to issue a warning to attract attention of a driver. More specifically, a distance by which the two-wheel vehicle B travels in the X direction during a time $\tau$ is given by $Vx \times \tau$, and the two-wheel vehicle B can stay in the detection area in a case that $Vx \times \tau < W$ is satisfied. A time T at which the two-wheel vehicle B reaches a TTC line is given by $T=Y/Vy$. The two-wheel vehicle B intersects the TTC line in a case that T<a TTC setting time is satisfied. The TTC setting time can be set to approximately 1.5 s, for example. Note that a TTC setting time in the normal operation mode is approximately 5 s, for example. Thus, in a case that $Vx \times \tau < W$ is satisfied, and Y/Vy<TTC setting time is satisfied, the calculation processing unit 13 causes the warning unit 16 to issue a warning.

According to the processing described above, in a case that the host vehicle C travels at a low speed due to a traffic jam or the like, the calculation processing unit 13 switches from the normal operation mode for detecting a two-wheel vehicle or a four-wheel vehicle to the operation mode for detecting a two-wheel vehicle as illustrated in FIG. 3. This enables the monitoring device 10 to issue a warning in a case that the two-wheel vehicle B will pass through either side of the host vehicle C. This can prevent the driver from changing direction without recognizing the two-wheel vehicle B traveling behind the host vehicle C and prevent the host vehicle C from colliding with the two-wheel vehicle B at a side of the host vehicle. This can also avoid a situation in which a driver or a passenger of the host vehicle C opens a door without recognizing the two-wheel vehicle B traveling behind the host vehicle C and the two-wheel vehicle B collides with the door. Alternatively, this can prevent a collision or a minor collision between the two-wheel vehicle B and hands or an object which a passenger of the host vehicle C puts out of the window opened by the passenger. Furthermore, setting the width W of the detection areas Dl, Dr narrower than usual allows a pedestrian walking along a sidewalk or a bicycle traveling along a sidewalk to be excluded from a detection target, which can prevent the occurrence of false detection. Experiments verified that even in a case where a strongly reflective metal body and a weakly reflective pedestrian are present in proximity, the monitoring device can detect the metal body and the pedestrian separately with ease using pulse-like electrical waves.

Next, the process executed in the embodiment illustrated in FIG. 1 will be described with reference to FIG. 6. Once the flowchart illustrated in FIG. 6 starts, the following steps are executed.

In step S10, the calculation processing unit 13 acquires a state of the host vehicle by referring to an output from the host vehicle state detection unit 12. For example, the calculation processing unit 13 acquires information such as a vehicle speed, a yaw rate, a state of a transmission output from the host vehicle state detection unit 12.

In step S11, the calculation processing unit 13 determines whether a speed of the host vehicle is less than a predetermined threshold Th. In a case that the vehicle speed is less than the predetermined threshold Th (vehicle speed<Th) (YES in step S11), the process proceeds to step S13; otherwise (NO in step S11), the process proceeds to step S12. For example, in a case that a vehicle speed is less than 10 km/h, the determination in step S11 is YES, and the process proceeds to step S13.

In step S12, the calculation processing unit 13 executes a normal determination process. More specifically, the calculation processing unit 13 sets the detection area Dnl (see FIG. 4) and a detection area (Dnr (not illustrated)) for detecting both a four-wheel vehicle and a two-wheel vehicle, detects a target in the detection areas, and executes a normal process for determining whether the target will possibly collide with the host vehicle C.

In step S13, the calculation processing unit 13 refers to an output from the other vehicle detection unit 11 and determines whether the target is present at either side behind the host vehicle C. In a case that the calculation processing unit 13 determines that the target is present at either side behind the host vehicle C (YES in step S13), the process proceeds to step S14; otherwise (NO in step S13), the process proceeds to step S12. More specifically, as one example, in a case that an X and Y coordinate positions of the target detected by the other vehicle detection unit 11 satisfy X<-(Wc/2) or X>(Wc/2), and Y<0, respectively, where Wc is a vehicle width of the host vehicle C, the calculation processing unit 13 determines that the target is present at either side behind the host vehicle C (YES), and the process proceeds to step S14.

In step S14, the calculation processing unit 13 refers to the state of the host vehicle C acquired in step S11 and determines whether a gear selector of the transmission of the host vehicle is shifted into a position other than "Reverse". In a case that the gear selector is shifted into a position other than "Reverse" (YES in step S14), the process proceeds to step S15; otherwise (NO in step S14), the process proceeds to step S12. For example, in a case that the gear selector is shifted into Drive (D), the process proceeds to step S15.

In step S15, the calculation processing unit 13 refers to the state of the host vehicle C acquired in step S11. In a case that the calculation processing unit 13 determines that the host vehicle C travels straight forward (YES in step S15), the process proceeds to step S16; otherwise (NO in step S15), the process proceeds to step S12. For example, in a case that a yaw rate obtained by referring to an output from the yaw axis sensor is 0.5 deg/s or less, the calculation processing unit 13 determines that the host vehicle C travels straight forward (YES), and the process proceeds to step S16.

In step S16, the calculation processing unit 13 sets a detection area corresponding to a two-wheel vehicle. More specifically, the calculation processing unit 13 sets the detection areas Dl, Dr, as illustrated in FIG. 3, to either side behind the host vehicle C.

In step S17, the calculation processing unit 13 determines whether a two-wheel vehicle is present in the detection areas Dl, Dr. In a case that the calculation processing unit 13 determines that a two-wheel vehicle is present in the detection areas (YES in step S17), the process proceeds to step S18; otherwise (NO in step S17), the process proceeds to step S22. For example, as illustrated in FIG. 2, the two-wheel vehicle B is passing through a left side of the other vehicle C1 following the host vehicle and approaching the host vehicle C, the calculation processing unit 13 determines that the two-wheel vehicle B is present in the detection area Dl illustrated in FIG. 3, and the process proceeds to step S18.

In step S18, the calculation processing unit 13 calculates a position (X, Y) of the two-wheel vehicle detected in step S16. More specifically, the calculation processing unit 13 calculates the position (X, Y) of the two-wheel vehicle B illustrated in FIG. 2 as a coordinate point on a Cartesian coordinate system with a center of the host vehicle C as an origin.

In step S19, the calculation processing unit 13 calculates a velocity (Vx, Vy) of the two-wheel vehicle detected in step S16. More specifically, the calculation processing unit 13 calculates the velocity (Vx, Vy) of the two-wheel vehicle B illustrated in FIG. 2.

In step S20, the calculation processing unit 13 determines whether the two-wheel vehicle B intersects the TTC line. In a case that the calculation processing unit 13 determines that the two-wheel vehicle B will intersect the TTC line (YES in step S20), the process proceeds to step S21; otherwise (NO in step S20), the process proceeds to step S22. More specifically, the calculation processing unit 13 determines whether the two-wheel vehicle B will intersect the TTC line using X, Y, Vx, and Vy found in the above process.

In step S21, the calculation processing unit 13 causes the warning unit 16 to issue a warning to attract attention of a driver or a passenger.

In step S22, the calculation processing unit 13 determines whether the process will be repeated. In a case that the calculation processing unit 13 determines that the process will be repeated (YES in step S22), the process returns to step S10, and a process similar to the above described process will be repeated; otherwise (NO in step S22), the process is terminated.

According to the above described flowchart, the operation described with reference to FIG. 1 can be achieved.

(C) Description of Modified Embodiment

It goes without saying that the embodiment described above is only an example and the present invention is not limited to the embodiment as described above. For example, in the above described embodiment, a warning is issued in a case that the two-wheel vehicle B detected in the detection areas Dl, Dr is expected to intersect the TTC. Besides the embodiments described above, for example, a warning may be issued when a driver operates a steering wheel or blinkers toward a lane where the two-wheel vehicle B travels regardless of whether the two-wheel vehicle B is expected to intersect the TTC or not. In such an embodiment, a side collision between the two-wheel vehicle B and the host vehicle changing direction can be prevented. Besides the embodiments described above, for example, a warning may be issued in a case that a driver or a passenger attempts to open a window or a door on a side where the two-wheel vehicle B passes through. In such an embodiment, a collision or a minor collision between the two-wheel vehicle B and hands or a door can be prevented in a case that a driver or a passenger puts his/her hands out of the window or opens the door. Furthermore, in a case that the two-wheel vehicle B is detected in the detection areas Dl, Dr, a warning to attract attention of a driver may be issued. Such a warning may include blinking an LED, and generating a sound.

The detection areas Dl, Dr having a fixed size are employed in the embodiment described above; however, a width W or a length L of the detection areas Dl, Dr maybe modified in accordance with a traveling speed of the host vehicle C or the like. For example, the length L may be increased, or the width W may be increased as a speed of the host vehicle decreases. A decrease in a speed of the host vehicle means an increase in a relative speed in relation to the two-wheel vehicle B. Increasing L or W as a speed decreases allows a two-wheel vehicle present farther away to be detected and be set as a warning target.

Additionally, in the embodiment described above, an example of the host vehicle C traveling at a low speed is given but, for example, for the host vehicle C being at rest due to a traffic jam, waiting for a traffic light, or the like, a warning may be issued in a case that a driver takes his/her foot off the brake pedal, presses on the gas pedal, or a gear selector is shifted from a neutral position into Drive (D).

In the embodiment described above, an example of a passing two-wheel vehicle is given but, for example, an object other than a two-wheel vehicle (e.g., a wheelchair, a walking aid vehicle, a tricycle, or a pedestrian) may be detected.

Figure 6:
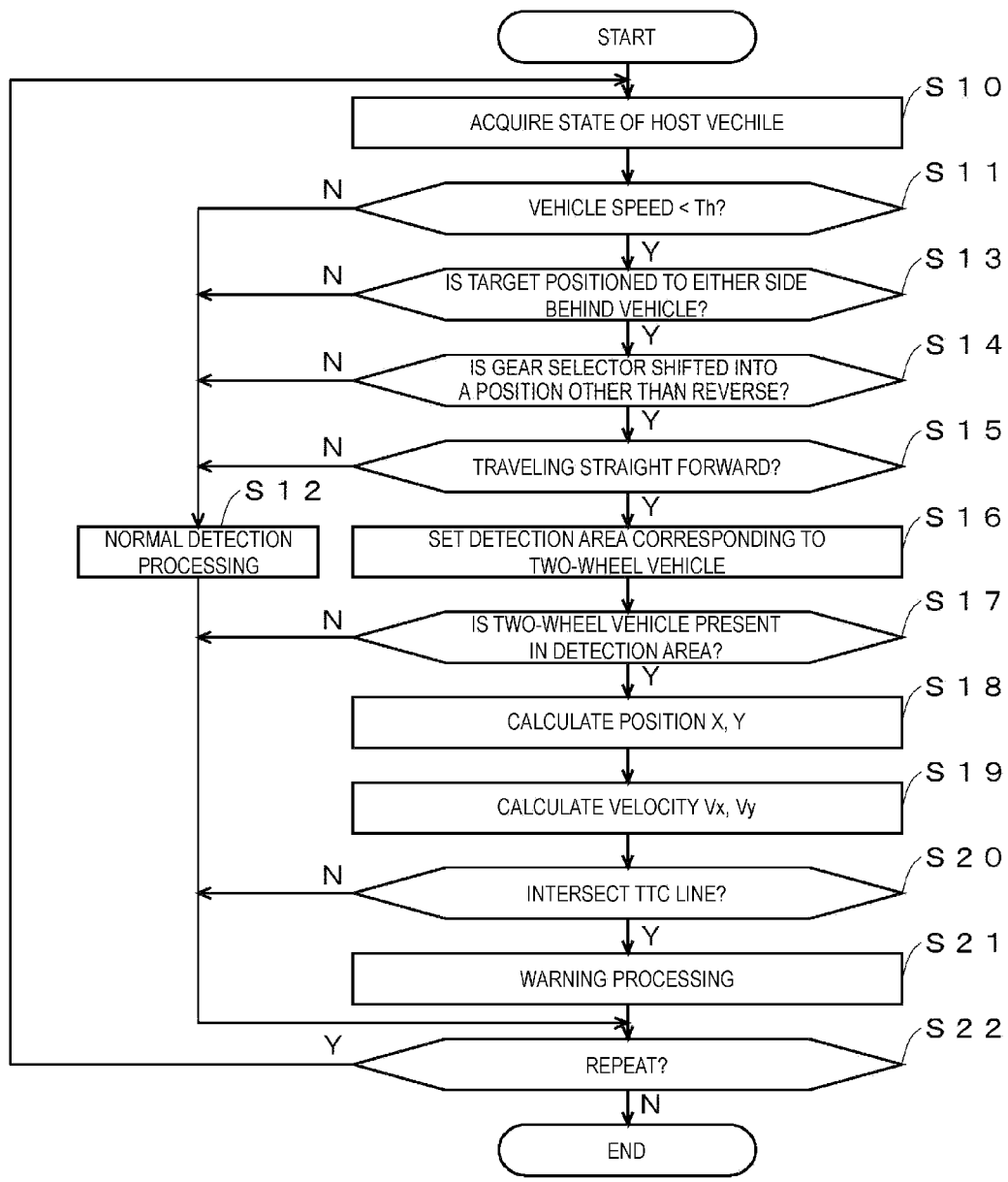
FIG. 6 is a flowchart for illustrating an example of the processing that is executed in the embodiment illustrated in FIG. 1.

In the flowchart illustrated in FIG. 6, determinations are made in accordance with a state at that point but, a history of past information may be stored, and determinations may be made in accordance with the history. This method can prevent the occurrence of an erroneous determination even in a case where conditions on a road rapidly change.

In the embodiment described above, only one of the normal determination process illustrated in step S12 of FIG. 6 and the processes for detecting a two-wheel vehicle illustrated in S15 or later is executed but, in a case that these processes are switched, the processes may be executed while overlapping. For example, in a case that the process switches from the normal determination process to the processes for detecting a two-wheel vehicle, or in a case that the process switches from the processes for detecting a two-wheel vehicle to the normal determination process, both processes may be executed concurrently for a predetermined time (e.g., approximately 10 sec). In such an embodiment, the possibility of failure to issue warning during a transitional period of switching the processes can be eliminated. Instead of switching the process using time-based trigger, in a case that the target is detected in each process, each process may continue until the target is no longer a risk, for example.

In the embodiment described above, a warning is issued only in the host vehicle in a case that the two-wheel vehicle passing by the host vehicle is detected, but for example, for vehicles capable of executing an inter-vehicle communication, the host vehicle may notify an adjacent vehicle of the two-wheel vehicle passing by the host vehicle, and attract an attention of the driver of the adjacent vehicle.

In the embodiment described above, a radar device configured to emit electric waves to detect an object is employed as the other vehicle detection unit 11, but the object may be detected by a method other than using the electric waves. For example, an object may be detected by emitting ultrasonic waves and analyzing a reflected wave thereof, or by emitting light such as infrared light or ultraviolet light and analyzing the reflected wave thereof. A camera may be employed to capture an image around a vehicle, and the processes may be performed by extracting an image of an area corresponding to the detection area from the captured image.

In step S13 of the flowchart illustrated in FIG. 6, whether the target is present at either side behind the vehicle is determined, but the process may be omitted and the detection area may be selected on the basis of a vehicle speed, a state of a gear, or whether the vehicle travels straight forward.

In a case that a speed of the detected target is less than a predetermined speed, for example, a warning may not be issued depending on settings by a passenger. For example, for a target approaching from 10 m behind the host vehicle in 3 seconds or greater (a target traveling at a less than 3.33 m/s speed), the target is considered to be a pedestrian walking around the vehicle or the like. In a case that a warning is issued against such a target, the process may be complicated depending on a usage environment. For this reason, a warning may not be issued depending on settings by a passenger.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A monitoring device configured to be installed in a vehicle to monitor traffic behind and on both sides of the vehicle, the monitoring device comprising:
   a radar configured to detect a traveling object in a pair of first detection areas that are defined behind and on left and right sides, respectively, of the vehicle and in a pair of second detection areas that are defined behind and on the left and right sides, respectively, of the vehicle, the second detection area each having a width in a vehicle width direction narrower than a width of the first detection area and a length in a vehicle length direction longer than a length of the first detection area towards a tail end thereof;
   a detector configured to detect a moving status of the vehicle, the detector detecting a moving direction in which the vehicle is moving and other moving indicators to find the moving status; and
   a processor that controls the radar, the processor causing the radar to switch from the pair of first detection areas to the pair of second detection areas when the detected moving status indicates that the moving direction of the vehicle is straight ahead and at least one of the other moving indicators satisfies a prescribed condition,
   wherein the processor causes the radar to select the pair of second detection areas only when the detector detects that the vehicle is traveling forward at a speed that is less than or equal to a prescribed speed, and
   wherein behind and on each side of and the vehicle, a side end of the second detection area closer to the vehicle is always set to a position nearer to the vehicle than a position of a side end of the first detection area closer to the vehicle so that the travelling object approaching from behind and passing by closer to the vehicle can be detected in the second detection area.

2. The monitoring device according to claim 1, further comprising:

an alarm configured to issue a warning when the radar is caused to select the pair of second detection areas, and the radar detects an object present in at least one of the second detection areas.

3. The monitoring device according to claim 1, further comprising:

an alarm configured to issue a warning when the radar is caused to select the pair of second detection areas, the radar detects an object present in at least one of the second detection areas, and the processor determines that the detected object will intersect a collision determination line set in said at least one of the second detection areas.

4. The monitoring device according to claim 1, further comprising:

an alarm configured to issue a warning when the radar is caused to select the pair of second detection areas, the radar detects an object present in at least one of the second detection areas, and the processor determines that an operation for changing the moving direction of the vehicle is performed.

5. The monitoring device according to claim 1, further comprising:

an alarm configured to issue a warning when the radar is caused to select the pair of second detection areas, the radar detects an object present in at least one of the second detection areas, and the processor determines that an operation for opening a window or a door of the vehicle is performed.

6. The monitoring device according to claim 1, wherein when the processor causes the radar to switch between the pair of first detection areas and the pair of second detection areas, the processor causes the radar to set the pair of first detection areas and the pair of second detection areas both active for a prescribed period of time.

7. The monitoring device according to claim 1, wherein the processor causes the radar to select the pair of first detection areas when the moving direction of the vehicle detected as part of the moving status is not straight ahead.

8. The monitoring device according to claim 1, wherein the processor causes the radar to select the pair of second detection areas when the detected moving status indicates that:

the moving direction of the vehicle is straight ahead;
the vehicle is traveling forward at a speed that is less than or equal to the prescribed speed; and
a gear selector of a transmission is at a position other than reverse.

9. A method for monitoring traffic behind and on a side of a vehicle, the method comprising:

detecting a moving status of the vehicle by a detector, the detector detecting a moving direction in which the vehicle is moving and other moving indicators to find the moving status; and controlling, by a processor, a radar that detects a traveling object in a pair of first detection areas that are defined behind and on left and right sides, respectively, of the vehicle and in a pair of second detection areas that are defined behind and on the left and right sides, respectively, of the vehicle, the second detection area each having a width in a vehicle width direction narrower than a width of the first detection area and a length in a vehicle length direction longer than a length of the first detection area towards a tail end thereof, wherein the control of the radar by the processor includes switching from the pair of first detection areas to the pair of second detection areas when the detected moving status indicates that the moving direction of the vehicle is straight ahead and at least one of the other moving indicators satisfies a prescribed condition, wherein the control of the radar by the processor includes selecting the pair of second detection areas only when the detector detects that the vehicle is traveling forward at a speed that is less than or equal to a prescribed speed, and wherein behind and on each side of and the vehicle, a side end of the second detection area closer to the vehicle is always set to a position nearer to the vehicle than a position of a side end of the first detection area closer to the vehicle so that the travelling object approaching from behind and passing by closer to the vehicle can be detected in the second detection area.

* * * * *